(12) United States Patent
Werdi

(10) Patent No.: US 12,715,734 B2
(45) Date of Patent: Aug. 25, 2026

(54) TRANSPORT OF PACKAGE FROM BUILDINGS PROVIDED WITH ELEVATORS

(71) Applicant: KONE Corporation, Helsinki (FI)

(72) Inventor: Nouri Werdi, Helsinki (FI)

(73) Assignee: KONE CORPORATION, Helsinki (FI)

( * ) Notice: Subject to any disclaimer, the term of this patent is extended or adjusted under 35 U.S.C. 154(b) by 132 days.

(21) Appl. No.: 18/906,264

(22) Filed: Oct. 4, 2024

(65) Prior Publication Data

US 2025/0026610 A1 Jan. 23, 2025

Related U.S. Application Data

(63) Continuation of application No. PCT/FI2022/050269, filed on Apr. 25, 2022.

(51) Int. Cl.

| | |
|---|---|
| ***B66B 1/46*** | (2006.01) |
| ***B25J 5/00*** | (2006.01) |
| ***B25J 9/16*** | (2006.01) |
| ***B66B 1/34*** | (2006.01) |

(52) U.S. Cl.

CPC ............... *B66B 1/468* (2013.01); *B25J 5/007* (2013.01); *B25J 9/1661* (2013.01); *B25J 9/1679* (2013.01); *B66B 1/3461* (2013.01)

(58) Field of Classification Search

CPC ..... B66B 1/468; B66B 1/3461; B66B 1/2408; B66B 3/006; B66B 2201/222; B66B 2201/4638; B25J 5/007; B25J 9/1661; B25J 9/1679; G05D 1/0282

See application file for complete search history.

(56) References Cited

U.S. PATENT DOCUMENTS 5,764,518 A * 6/1998 Collins .................. B25J 9/1617 700/95
8,333,346 B2 * 12/2012 Im .......................... B64G 99/00 244/125
10,924,603 B1 * 2/2021 Clements ............... G06Q 20/18
11,221,680 B1 * 1/2022 Clements ................ G06F 3/017

(Continued)

FOREIGN PATENT DOCUMENTS

KR 10-2022-0032857 A 3/2022
WO WO 2021/156535 A1 8/2021

OTHER PUBLICATIONS

International Search Report, issued in PCT/FI2022/050269, dated Dec. 1, 2022.

(Continued)

*Primary Examiner* — Bhavesh V Amin
(74) *Attorney, Agent, or Firm* — Birch, Stewart, Kolasch & Birch, LLP

(57) ABSTRACT

A control system for arranging a transport of a package from a building provided with an elevator system is described, in which the control system is configured to: receive an indication that the mobile robot has received the package, generate an acknowledgement to the mobile robot, arrange an elevator service to the mobile robot, and generate, in response to a detection that the mobile robot exits the building, a control signal to a robot controller, the control signal including data indicative on an assignment of a responsibility of a control of the mobile robot to the robot controller. A method and a computer program medium are also provided.

21 Claims, 3 Drawing Sheets

(56) References Cited

U.S. PATENT DOCUMENTS 11,537,352 B1 * 12/2022 Clements ............... G06Q 20/18
11,907,421 B1 * 2/2024 Clements ............... G06F 3/012
11,926,504 B2 * 3/2024 Wedzikowski ....... B66B 1/3407
12,511,014 B1 * 12/2025 Clements ............... B66B 1/468
2004/0143559 A1 * 7/2004 Ayala ..................... G06N 3/086 706/26
2007/0129849 A1 * 6/2007 Zini ..................... G05D 1/0225 700/258
2012/0293605 A1 * 11/2012 Seferian ............. H04L 65/1069 348/E7.083
2014/0131142 A1 * 5/2014 Parkkinen ............... B66B 1/468 187/382
2015/0246790 A1 * 9/2015 Hiltunen ............... B66B 1/2408 187/382
2017/0193360 A1 * 7/2017 Gao ......................... G06N 3/08
2018/0182199 A1 * 6/2018 Yamine ................... B66B 5/024
2019/0067508 A1 * 2/2019 Spotti ..................... H10F 71/00
2020/0258094 A1 * 8/2020 Abrams ............... G06Q 30/018
2021/0302971 A1 * 9/2021 Cousins ............... G05D 1/0094
2021/0387829 A1 * 12/2021 Min ...................... B66B 1/2408
2021/0400908 A1 * 12/2021 Smith .................. A01K 1/0035
2023/0012098 A1 * 1/2023 Trösch .................... B66B 1/468
2023/0036694 A1 * 2/2023 Coughlan .............. G06Q 20/02
2023/0143635 A1 * 5/2023 Takai ................... G05D 1/0027 701/2
2023/0271809 A1 * 8/2023 Carparelli ................. B66B 9/00 187/249
2023/0416053 A1 * 12/2023 Kang ........................ B66B 1/02
2024/0002194 A1 * 1/2024 Kang ...................... B66B 1/468
2024/0083710 A1 * 3/2024 Kim ...................... B66B 1/2458
2024/0217775 A1 * 7/2024 Kuusinen .............. B66B 1/2458
2025/0013974 A1 * 1/2025 Luong ................ G06Q 10/0835
2025/0013975 A1 * 1/2025 Werdi ................ G06Q 10/0835
2025/0026610 A1 * 1/2025 Werdi ...................... B25J 5/007

OTHER PUBLICATIONS

Written Opinion of the International Searching Authority, issued in PCT/FI2022/050269, dated Dec. 1, 2022.

* cited by examiner

TRANSPORT OF PACKAGE FROM BUILDINGS PROVIDED WITH ELEVATORS

CROSS REFERENCE TO RELATED APPLICATIONS

This application is a Continuation of PCT International Application No. PCT/FI2022/050269, filed on Apr. 25, 2022, which is hereby expressly incorporated by reference into the present application.

TECHNICAL FIELD

The invention concerns in general the technical field of building management. More particularly, the invention concerns controlling of a cooperation of different systems for an operation of a robot provided with a specific task.

BACKGROUND

The development in various areas of technologies has enabled an autonomous driving of devices, such as mobile robots. This technical development has allowed introducing new service models in various business areas such as in a field of package transport wherein the mobile robots have been involved in a transport of packages, or other goods or food. This kind of approach may bring efficiency in the transport but also bring cost savings due to that human operator is not needed in the transport.

However, the utilization of the mobile robots in the transport of packages works satisfactorily to an extent that the mobile robot, such as an autonomous vehicle, operates outdoors and travels e.g. in public streets and follows the traffic regulations in place in the area of operation. The transport becomes more complex in a situation where the intent is to arrange the transport of packages in an end-to-end manner i.e. from the sender to the recipient so that the route combines both indoor and outdoor sub-routes. The reason for the complexity—especially in case the mobile robot requires to operate in a multi-floor building, such as in a block house—is that a travel of the robot from a source location to a destination may require utilization and communication with various systems implemented in the building.

Hence, there is a need to introduce solutions enabling a transport of packages with robots from a building.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a control system, a method, and a computer program for arranging a transport of a package from a building.

The objects of the invention are reached by a control system, a method, and a computer program as defined by the respective independent claims.

According to a first aspect, a control system for arranging a transport of a package from a building provided with an elevator system is provided, the control system is configured to:

- receive an indication descriptive on that the mobile robot has received the package from a sender to transport the package from the building,
- generate an acknowledgement to the mobile robot, the acknowledgement comprising data causing the mobile robot to initiate the transport of the package,
- arrange an elevator service to the mobile robot by generating an elevator call to the elevator system to request an arrival of an elevator car to a floor the mobile robot resides and a travel of the elevator car to a destination floor comprising an entrance door of the building, and
- generate, in response to a detection that the mobile robot exits the building, a control signal to a robot controller, the control signal comprising data indicative on an assignment of a responsibility of a control of the mobile robot to the robot controller.

The control system may be arranged to receive the indication descriptive on that the mobile robot has received the package from a sender to transport the package from the building from at least one of the following: the mobile robot; the sender of the package.

The control system may be configured to monitor a waiting time of the mobile robot to receive the package in response to an arrival of the mobile robot at a collection point of the package. For example, the control system may be configured to release the mobile robot from a task of transporting the package in response to a detection that the mobile robot does not receive the package within a predefined time window set as an acceptable waiting time.

The control system may also be configured to generate the acknowledgement comprising route data for the mobile robot to exit the building.

The control system may be configured to trigger a generation of the elevator call based on at least one of the following: a generation of the acknowledgement; a detection that the mobile robot resides in a predefined location in the building.

Moreover, the control system may further be configured to:

- generate a control signal to a monitoring system to initiate a monitoring of the mobile robot in a floor comprising an entrance door to exit the building.

For example, the control system may be configured to generate the control signal to initiate the monitoring of the mobile robot in response to a detection that the elevator car arrives at the floor comprising the entrance door. Still further, the control system may be configured to perform the detection that the mobile robot exits the building based on the data received from the monitoring system.

Still further, the control system may further be configured to:

- monitor a duration between the generation of the elevator call and the exit of the mobile robot from the building by comparing if the duration is within a predefined duration limit, and
- generate, in response to a detection that the predefined duration limit is exceeded, an alarm to the robot controller to indicate a delay in a package transport.

According to a second aspect, a method, performed by a control system, for arranging a transport of a package from a building provided with an elevator system is provided, the method comprises:

- receiving an indication descriptive on that the mobile robot has received the package from a sender to transport the package from the building,

- generating an acknowledgement to the mobile robot, the acknowledgement comprising data causing the mobile robot to initiate the transport of the package,
- arranging an elevator service to the mobile robot by generating an elevator call to the elevator system to request an arrival of an elevator car to a floor the mobile robot resides and a travel of the elevator car to a destination floor comprising an entrance door of the building, and
- generating, in response to a detection that the mobile robot exits the building, a control signal to a robot controller, the control signal comprising data indicative on an assignment of a responsibility of a control of the mobile robot to the robot controller.

The indication descriptive on that the mobile robot has received the package from a sender to transport the package from the building may be received from at least one of the following: the mobile robot; the sender of the package.

A waiting time of the mobile robot to receive the package may be monitored in response to an arrival of the mobile robot at a collection point of the package. For example, the mobile robot may be released from a task of transporting the package in response to a detection that the mobile robot does not receive the package within a predefined time window set as an acceptable waiting time.

The acknowledgement comprising route data for the mobile robot to exit the building may be generated.

A generation of the elevator call may be triggered based on at least one of the following: a generation of the acknowledgement; a detection that the mobile robot resides in a predefined location in the building.

The method may further comprise:

- generating a control signal to a monitoring system to initiate a monitoring of the mobile robot in a floor comprising an entrance door to exit the building.

For example, the control signal to initiate the monitoring of the mobile robot may be generated in response to a detection that the elevator car arrives at the floor comprising the entrance door. The detection that the mobile robot exits the building may e.g. be performed based on the data received from the monitoring system.

The method may further comprise:

- monitoring a duration between the generation of the elevator call and the exit of the mobile robot from the building by comparing if the duration is within a predefined duration limit, and
- generating, in response to a detection that the predefined duration limit is exceeded, an alarm to the robot controller to indicate a delay in a package transport.

According to a third aspect, a computer program comprising computer readable program code configured to cause performing of the method according to the second aspect as defined above when the computer readable program code is run on one or more computing apparatuses.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features.

The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
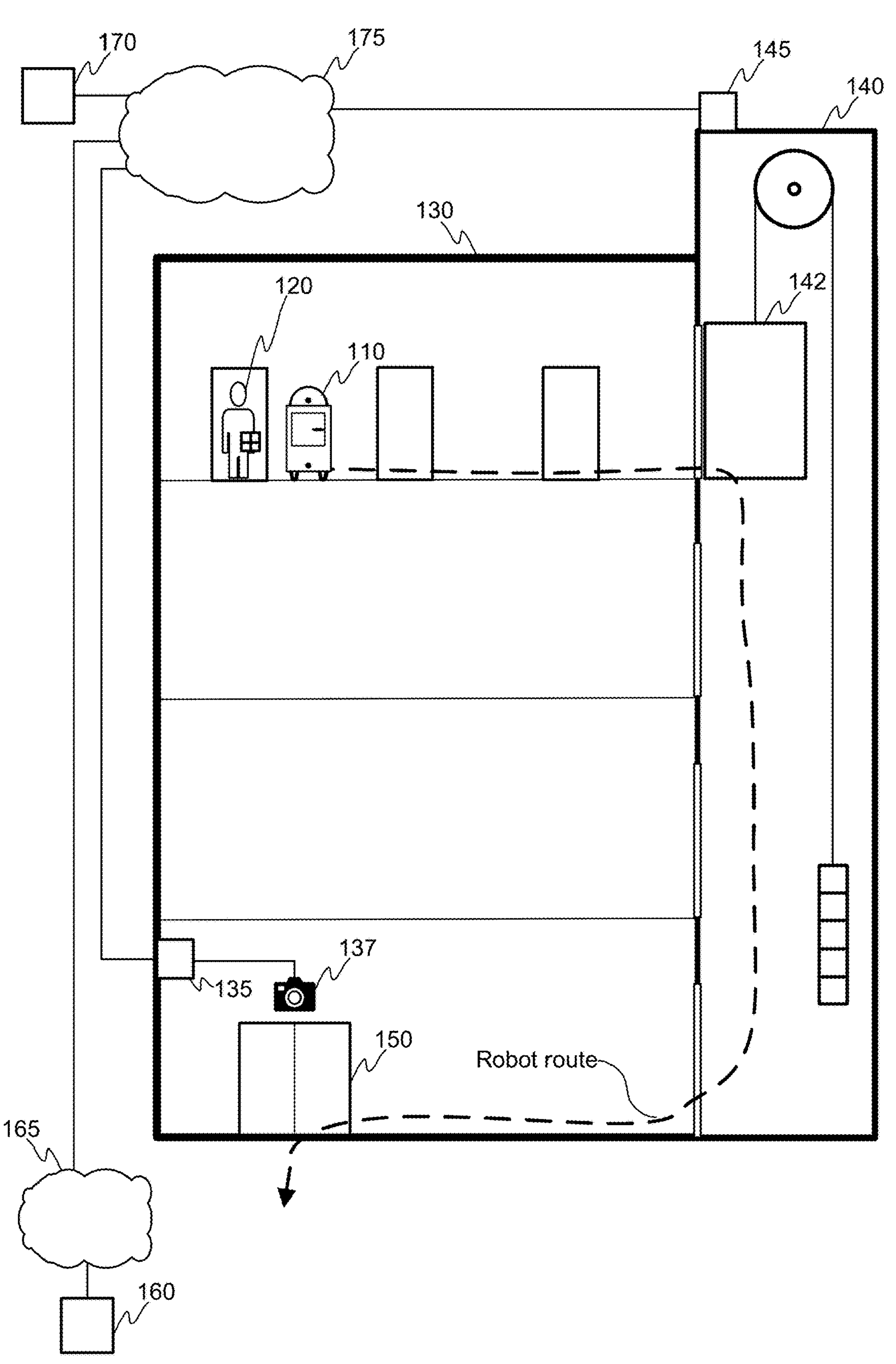
FIG. 1 illustrates schematically an application environment according to an example.

FIG. 1 illustrates schematically an application environment of the present invention according to an example embodiment. The invention may be implemented in an environment in which a transport of a package, or similar, is arranged from a building 130 by using a robot 110 being mobile in nature and capable of traveling in an autonomous manner in accordance with instructions provided to it. In the forthcoming description the robot 110 is called as a mobile robot and referred with the reference 110. As said, the transport of the package, or anything similar, is in accordance with the present solution arranged so that the mobile robot 110 transports the package from the building 130 comprising a plurality of systems and wherein the building 130 is a multistorey building in which a travel between at least some of the floors may occur with an elevator system 140. Hence, for the purpose of describing at least some aspects of the present invention it is assumed that the sender 120 of the package resides in a floor requiring traveling with an elevator 140 to an entrance door 150 from which the mobile robot 110 may exit the building 130.

The elevator system 140 may be any kind of elevator configured to provide transportation service between at least some of the floors in the building 130. The elevator system 140 may comprise one or more elevators for serving visitors of the building 130. The elevator system 140 is controlled by an elevator controller 145 which is configured to generate control signals in accordance with an input received from a number of sources in order to manage a service provision of the elevator system 140 in the building 130.

The building 130 may also be provided with other systems wherein at least one of the systems may be an access control system managed by an access controller 135. The access control system may be configured to control a number of entities in the building such as at least some doors, some gates, and/or similar entities. In other words, the access control system may e.g. be configured to generate control signals to lock and unlock entities under control of it as well as to generate further control signals e.g. for opening and closing the same entities. As a non-limiting example the access controller 135 may generate a control signal to unlock the door 150 of the building 130 and opening it without any physical interaction required by a user, or by the party using the door, such as the mobile robot 110. Correspondingly, the access controller 135 may generate control signals for closing the door 150 and for locking it. As said, the access controller 135 may be configured to control also other entities than the entrance door 150 e.g. in a travel path of the mobile robot 110 in the building 130.

The access control system may also comprise a sub-system for monitoring events in a predefined areas of the building. The monitoring system referred with 137 in FIG. 1 may comprise a number of sensors, such as image capturing devices, readers and/or similar, for monitoring various areas, or spaces, of the building, such as the area in front of the entrance door 150 and also inside the building, such as a hall area of the building. For sake of completeness it is worthwhile to mention that the monitoring system 137 may be a sub-system of the access control system or a separate system configured to perform as described in the forthcoming description. The monitoring system 137 may e.g. be configured to generate various signals either alone or in cooperation with the access controller, such as access requests as is described in the forthcoming description.

The building 130 may also be equipped with various further systems, such as different kind of communication systems, such as Wi-Fi based wireless local area network, and indoor positioning system utilizable by entities allowed to access them.

Figure 2:
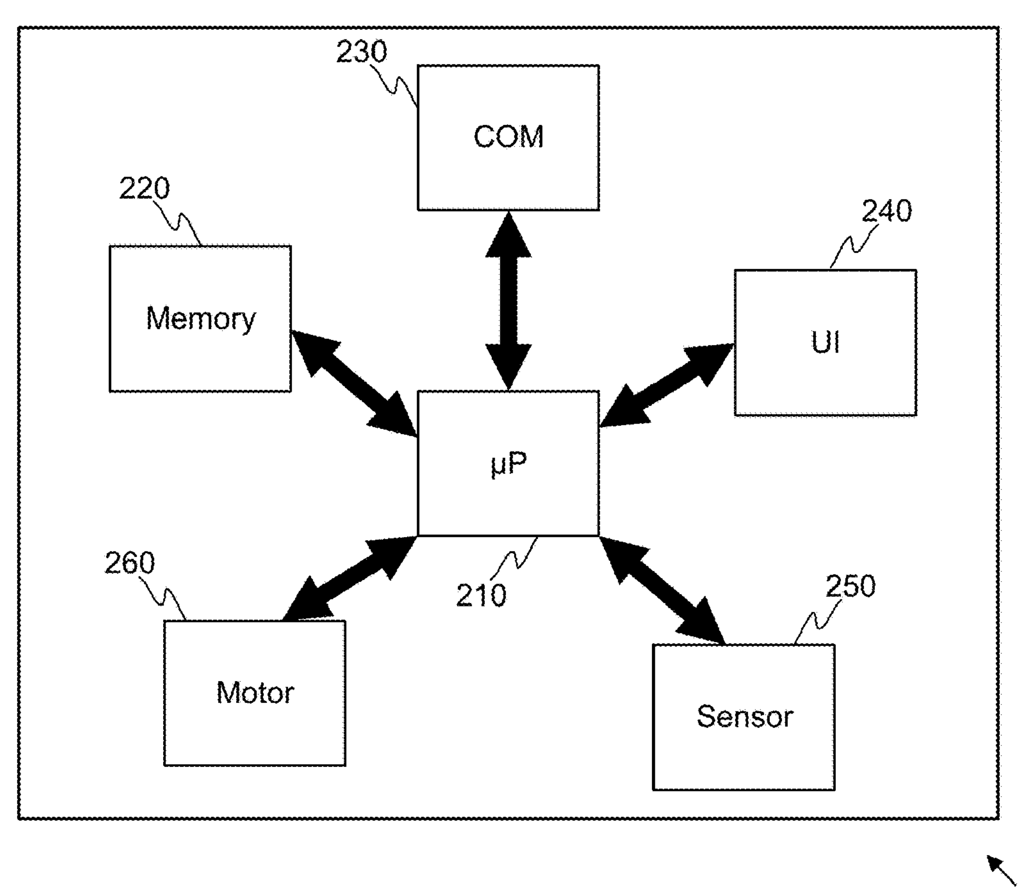
FIG. 2 illustrates schematically a mobile robot according to an example.

FIG. 2 illustrates schematically an example of the mobile robot 110 according to an example embodiment configurable to perform the transport of the package from the building 130 to the destination. The mobile robot 110 may comprise at least the following entities: a processing unit 210, a memory unit 220, a communication unit 230, a user interface (UI) unit 240, a sensor unit 250 and a motor unit 260. The mentioned entities may comprise one or more operating units, e.g. one or more microprocessors or similar, one or more memories, one or more communication devices, such as modems, one or more user interface devices, one or more sensors and one or more motors among other components of the respective entities if any. In addition to the mentioned entities the mobile robot 110 may comprise further devices and entities, such as batteries for storing energy to be used by the other entities. The entities belonging to the mobile robot 110 may be communicatively coupled to each other with e.g. a communication bus. The processing unit 210 may be configured to control the operation of the mobile robot 110 as well as a communication with external entities e.g. in a manner as described in the forthcoming description. The communication with the external entities may be performed e.g. in a wireless manner. In accordance with at least some example embodiments the user interface unit 240 of the mobile robot 110 may comprise a container for the package arranged to be transported by the mobile robot 110. Generally speaking, the container shall be understood as any space into which the package may be positioned so as to enable the transportation. In some implementations the container may be lockable so as to prevent $3^{rd}$ persons to access the package during the transportation. Various approaches to unlock the container may be implemented as is described in the forthcoming description.

The sensor unit 250 may comprise any sensors by means of which the mobile robot 110 may obtain information on an environment, but also the sensor unit 250 may comprise sensors enabling positioning and/or navigation within the location. This may refer to devices enabling a utilization of one or more indoor positioning systems, e.g. those implemented in the building 130. For sake of completeness the indoor positioning may, in some implementations, be based on a communication implemented over the communication interface 230 of the mobile robot 110. The processing unit 210 may also be configured to generate control signals to the motor unit 260 in order to make the mobile robot 110 to move. Moreover, the mobile robot 110 may comprise means enabling the robot to be mobile, such as any applicable transport means like wheels with other required elements and devices. The operation of the processing unit 210 may be achieved by executing portions of computer program code stored e.g. in the memory unit 220 for generating the control signals and, thus, causing the mobile robot 110 to operate in the manner as described. The memory unit 220 may also be used for storing obtained and received information together with any other data either permanently or temporarily. Still further, it is worthwhile to mention that the communication unit 230 may, as already mentioned, comprise a number of devices configured to implement selected communication technologies preferably in a wireless manner so as to make the mobile robot 110 capable of communicating with various parties.

The mobile robot 110 may be communicatively connected to a robot controller 160 over a communication network 165 which may be a mobile communication network enabling a wireless communication with the mobile robot 110. The robot controller 160 may be a computing device generating control signals to the mobile robot 110 as well as may receive signals from the mobile robot 110.

Additionally, the robot controller 160 may be communicatively connected to other entities as is described in the forthcoming description. The robot controller 160 may e.g. deliver control signal to the mobile robot 110 wherein the control signal may e.g. carry data indicative of a destination of a package and other instructions in relation to the transport of the package. As a result of this the mobile robot 110 may e.g. travel in an autonomous manner in the building 130 and request utilization of a number of systems and devices in order to perform the transport as is described in the forthcoming description. In accordance with some example embodiments the sender 120 of package may be communicatively connected from their own system to the robot controller 160 in order to arrange a transport of the package from the building 130 with the mobile robot 110 managed by the robot controller 160. In other words, an operator of the mobile robot system may provide the transport service to other entities.

In accordance with an example embodiment the system may comprise a control system 170 configured to orchestrate a transport of the package by the mobile robot 110 in the building 130. The control system 170 may be accessible over a communication network 175 which may be a data network, such as Internet. The communication network 175 may be communicatively operative with the other communication network 165 in a known manner. In some example embodiment the communication networks referred with 165 and 175 in FIG. 1 may be the same network. Hence, the control system 170 may be communicatively connected with other entities either directly or indirectly, such as with the elevator controller 145, the access controller 135, and the robot controller 160 over the communication networks 165, 175. In some example embodiments, the mobile robot 110 may be provided with an application enabling communication with the control system 170 without guiding the communication between the mobile robot 110 and the control system 170 through the robot controller 160.

In other words, the control system 170 is provided with interfaces, such as application programming interfaces (API), enabling the communication between the mentioned entities. For sake of clarity it is worthwhile to mention that a functionality of the control system 170 may be integrated into at least one of the other controllers 135, 145, 160 introduced in the foregoing description.

Figure 3:
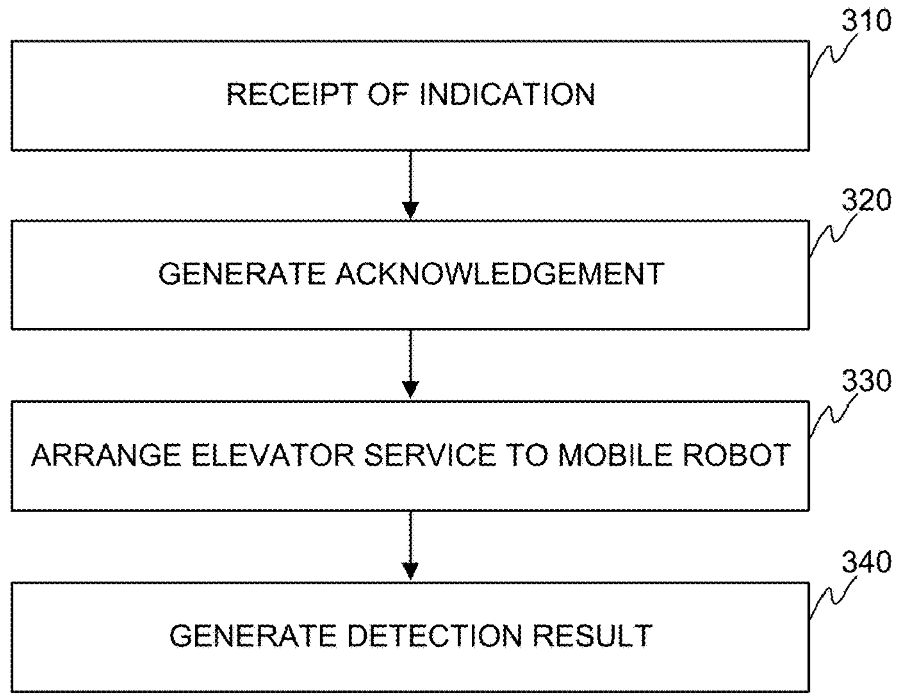
FIG. 3 illustrates schematically a method according to an example.

Next further aspects in relation to the present invention are described by referring to FIG. 3. FIG. 3 illustrates schematically an example embodiment of a method according to the invention. The method is described from the control system 170 point of view in FIG. 3. As derivable from the foregoing description the mobile robot 110 is provided with a task to transport a package to a destination from the building 130 and as a starting point for describing at least some aspects in relation to the invention the mobile robot 110 has arrived at a collection point of the package, which may e.g. be a door of an apartment in the building 130. However, prior to arrival of the mobile robot 110 at the collection point in the building 130 the task of transportation may be provided to the mobile robot 110 in response to an order of the transport service. The order may have been provided by the sender 120 e.g. by using her/his user device, such as a mobile phone. For example, the user device may be configured to execute an application software by means of which the transport order may be provided. The provision of the transport order may require that a location of the collection point and/or a destination of the package are provided together with information identifying the sender 120 in a required accuracy. Additionally, the sender 120 may be requested to arrange a payment of the transport service prior to that the task is assigned to the mobile robot 110. By providing the required pieces of information in the transport service a task may be provided to a mobile robot 110 from a robot controller 160, which in turn may have received a transport service order from the transport service if the entities are separate. As a conclusion of the ordering process the mobile robot 110 is provided with a necessary information so as to arrive at the collection point defined e.g. in the described manner.

The mobile robot 110 when arriving at the building 130 may be provided with an access to the building 130 through the entrance door 150 and be connected to a various systems available in the building 130, such as indoor positioning system, and similar. Moreover, the mobile robot 110 may be arranged to communicate with the control system 170 over the robot controller 160 so that it is possible to control at least in part a roaming of the mobile robot 110 in the building. For example, the mobile robot 110 may either inform the robot controller 160 on the arrival at the entrance door 150 or the robot controller 160 may be configured to monitor a location of the mobile robot 110 during the task and to detect that the mobile robot 110 has arrived at the building 130 and resides in a predefined vicinity from the entrance door 150. In response to the arrival the robot controller 160 may, in response to a receipt of an acknowledgement signal indicative of the arrival from the mobile robot 110 or in response to the internal detection as described, generate an access request to the control system 170 for requesting access in the building 130. The decision if the mobile robot 110 is allowed to access the building 130 may comprise a number of security related operations and upon a positive result of the security operations an access right may be granted to the mobile robot 110.

In case the access right is granted to the mobile robot 110 it may be communicated to the mobile robot 110. The communication may be performed either through the robot controller 160 or directly to the mobile robot 110 in case a communication connection is possible to be directly established. The communication may comprise data generated by the control system 160, the data being indicative of that the mobile robot 110 may access the building 130 through the entrance door 150. In addition to that the control system 170 may have generated further data to be included in the communication with the mobile robot 110. The further data may comprise data defining instructions how the mobile robot 110 may find its way to the sender 120 in the building 130, i.e. a route data to the collection point. In other words, the further data may comprise so-called driving instructions to the collection point in the building 130. Such data may e.g. define a route e.g. in a map data of the building 130 the mobile robot 110 shall follow in the building 130. The data generated by the control system 170 may also comprise additional data defining at least one system available for utilization communicatively in order to keep on track on the location with respect to the defined route in the building 130. For example, the additional data may define an indoor positioning system to be connected with for the mobile robot 110 together with any access information, such as password, if applied therein. Moreover, the further data may comprise data descriptive of a communication networks available in the building 130, such as Wi-Fi network, with any access credentials to it so that the mobile robot 110 is able to connect to the communication network provided in the building 130. In accordance with some example embodiments the mobile robot 110 is required to connect to a communication network available in the building 130 in order to access the building 130. This kind of approach improves a security since a roaming of the mobile robot 110 in the building may be monitored e.g. by the control system 170 in real-time, or at least in an acceptable accuracy. In a still further embodiments the communication connection of the mobile robot 110 may be used for controlling the movement of the mobile robot 110 in the building 130 by the control system 170. In other words, the control of the movement of the mobile robot 110 may be granted to the control system 170 which generates instructions to mobile robot 110 e.g. in a continuous manner to lead the mobile robot 110 to the collection point of the package in a controlled manner. The traveling to the collection point may require a utilization of systems implemented in the building 130, such as an elevator system, controlled by the control system 170 at least in part.

With respect to an entering phase in the building 130 and regarding the travel of the mobile robot 110 to the collection point the sender 120 of the package may be arranged to be informed on the progress of the travel. For example, the progress of the mobile robot 110 in the route in the building 130 may be monitored in a various of ways, such as by receiving status updates from the mobile robot 110 by the robot controller 160, which is further configured to deliver the information to the control system 170. Alternatively or in addition, the control system 170 may receive status data, such as position data, from the systems implemented in the building, such as utilizing sensor data based on which it is possible to generate detections on a presence of objects, such as the mobile robot 110, in the building 110. With the data it is possible to generate data indicative on the progress of an arrival of the mobile robot 110 to the collection point and deliver it to the sender's user terminal e.g. via the application software used for ordering the transport service. For example, the data may indicate the time it takes from the mobile robot 110 to arrive at the collection point and it may be updated at regular intervals. In this manner the sender 120 may prepare for the delivery of the package to the mobile robot 110 at the collection point in order to initiate the transport of the package from the building 130.

Next, aspects in relation to a transport of a package from the building 130 are described by referring to FIG. 3 schematically illustrating a method according to an example embodiment of the present invention. The starting point for the method as illustrated in FIG. 3 is that the mobile robot 110 has arrived at the collection point of the package being e.g. an entrance door of an apartment the sender 120 lives or an office room in the building 130. As said, the mobile robot 110, and the systems in the building 130, may be at least in part controlled by the control system 170 as is described in the forthcoming description wherein the control operations may relate to monitoring, communicating, and controlling of the various systems and the mobile robot 110. In response the mobile robot 110 has reached the collection point it starts waiting for that the sender 120 provides the package to be transported to the mobile robot 110. At some point the sender 120 may arrive at the mobile robot 110 and the mobile robot 110 receives the package. The receipt of the package may comprise an operation in which the mobile robot 110 has opened a container dedicated for the package and the user inputs the package there and the mobile robot 110 closes the container. Alternatively or in addition, the input of the package may comprise manual interaction by the sender 120 with the container which may comprise opening and closing a lid of the container in a predefined manner. In accordance with some example embodiments a security of the system is improved so that the user is provided with an access code to open the lid of the container. The access code may be provided to the user upon an assignment of the transport order and the mobile robot 110 is provided with a user interface, such as a touch screen and/or a keyboard, through which the sender 120 may input the access code and if the code is valid the lid of the container opens. When the sender 120 has input the package to the container, the sender 120 closes the lid and it gets locked again. This prevents $3^{rd}$ parties to access the package during the transport. Upon the receipt of the package by the mobile robot 110 the control system 170 may receive 310 an indication descriptive on that the mobile robot 110 has received the package from a sender 120 to transport the package from the building 130. The indication may be received from various sources wherein the first possible source of the indication may be the mobile robot 110 wherein the mobile robot 110 generates a message to the robot controller 160 which may be configured to generate a signal to the control system 170 to inform the same. In accordance with another approach the sender 120 may provide the indication on the provision of the package to the mobile robot 110 e.g. with an application used for the transport order. The signals, such as the indication, received from the application may be analyzed and the respective entities related to the received indication in one manner, or another, may be informed. Hence, if the application is provided with the transport company, the respective system may be communicatively connected to the control system 170 in order to continue the operation as is described in the forthcoming description. At least the indication on the receipt 310 of the package may be acknowledged 320 by the control system 170 so as to indicate the mobile robot 110 that a transport of the package may be initiated.

In accordance with some example embodiments it may be arranged that a waiting time of the mobile robot 110 to receive the package to be transported is monitored, or even limited. Namely, the control system 170 may be configured to, e.g. in response to a receipt of indication that the mobile robot 110 has arrived at the collection point, to initiate a timer for monitoring that the package is received by the mobile robot 110 in a due course defined by a run time of the timer. In other words, the runtime of the timer defines an acceptable waiting time for the mobile robot 110 to receive the package. Naturally, the running of the timer may be triggered based on another instant, e.g. on a transmission of a message sent to the sender 120 to indicate that the mobile robot 110 has arrived at the collection point. In case the control system 110 recognizes that the timer runs out before an indication descriptive that the mobile robot 110 has received 310 the package the control system 170 may be configured to initiate predefined operations. The predefined operations may comprise, but is not limited to, a generation of a reminder message to the sender 120 which may re-trigger the timer again. Alternatively or in addition, the control system 170 may be configured to generate a signal to the robot controller 160 to release the mobile robot 110 from the assigned task of transporting the package. The release of the mobile robot 110 may occur either directly when the timer runs out the first time, or it may be triggered to that the package is not received even if the timer is run out several times e.g. due to the generation of the reminder message, or the release may be triggered in another way. The advantage in monitoring the waiting time of the mobile robot 110 and arranging a release of the task is that in that manner it is possible to optimize a utilization of the resources related to the transport of the package. In case the mobile robot 110 is released from the task e.g. with a control signal generated by the robot controller 160 the travel of the mobile robot 110 may be arranged in the same manner as in case the package is received by the mobile robot 110.

As said, in response to that the control system 170 receives 310 the indication it may be arranged to generate 320 an acknowledgement to the mobile robot 110 wherein the acknowledgement comprising data causing the mobile robot 110 to initiate the transport of the package. For example, the control system 170 may be configured to generate the acknowledgement to the robot controller 160 which, in turn, informs the mobile robot 110 on the situation and that the mobile robot 110 is allowed to initiate the transport of the package. In case the control system 170 and the mobile robot 110 are in a direct communication connection e.g. by utilizing the wireless communication networks available in the building the control system 170 may be directly generate the acknowledgement to the mobile robot 110 but advantageously the robot controller 160 may also be kept information on a state of the mobile robot 110.

Moreover, in some example embodiments the control system 170 may be configured to determine a route for the mobile robot 110 to exit the building 130 in response to the receipt 310 of the indication and include the route data into the data transmitted to the mobile robot 110 in the acknowledgement. The route data is provided in a format the mobile robot 110 may utilize in its travel with a help of any necessary systems, such as indoor positioning system arranged in the building 130, and/or any other system. The route data may also comprise so-called route point data indicative of special states or situations during the route. It may define e.g. locations and/or timing information at which the mobile robot 110 may behave in a special manner, such as stop during the route and communicate with a certain system as is derivable from the forthcoming description.

Since the mobile robot 110 resides on a floor from which it is required to use a service provided by the elevator system 140 in order to exit the building 130, the control system 170 is configured to arrange 330 the elevator service to the mobile robot 110. The arranging 330 of the elevator service may be implemented by generating an elevator call to the elevator system 140. In accordance with the invention the service call is generated so that it comprises data descriptive of a request of an arrival of an elevator car 142 to the floor the mobile robot 110 resides and a travel of the elevator car 142 to a destination floor comprising an entrance door of the building 130. Hence, according to an example the elevator call may advantageously carry both data defining at least the departure floor and data defining the destination floor of the travel for the mobile robot 110. In accordance with some other example embodiments the request may be generated in two phases wherein first a first request is generated defining the departure floor and second a second request is generated defining the destination floor. The second request may e.g. be generated with a wireless interaction between the mobile robot 110 and a reader device residing in the elevator car 110, for example. Alternatively, the mobile robot 110 may indicate the robot controller 160 that the robot has entered the elevator car 142 and the robot controller 160 requests the control system 160 to arrange the travel to the floor having the entrance door 150. Hence, the control system 160 may generate such a request to the elevator controller 145.

The generation of the elevator call may be arranged to be dependent on one or more predefined conditions. According to an embodiment the elevator call may be generated in response to the generation 320 of the acknowledgement to the mobile robot 110. This has an advantage that it increases an efficiency in the travel since the mobile robot 110 and the elevator car 142 are both caused to head to a landing area of the elevator car 142 at the same time. According to another example embodiment the generation of the elevator call may be triggered dependently on a predefined location of the mobile robot 110 in the building 130, wherein the location may be defined based on a distance of the mobile robot 110 from the elevator door at the floor the mobile robot 110 resides and from which the departure of the travel occurs with the elevator system 140. A determination of the location the mobile robot 110 resides may be based on data obtainable from an indoor positioning system or from any sensor system suitable to generate data from which it is possible to determine a location of the mobile robot 110 with a required accuracy.

In accordance with an embodiment it may be arranged that when the elevator car 142 arrives at the floor the mobile robot 110 resides the elevator controller 145 may be configured to inform that to the control system 170 which then generates an acknowledgement to the robot controller 160. The robot controller 160 may then generate a signal to the mobile robot 110 carrying the package so that the mobile robot 110 may e.g. perform predefined operations to access the elevator car 142. The predefined operations may e.g. comprise a control of a speed of the mobile robot 110 to match with settings defined for the mobile robot 110 for accessing the elevator car 142. Furthermore, the predefined operations may comprise a setup of a communication connection with the elevator car 142 e.g. over a communication facilities arranged in the elevator car 142 to provide control signals to a car operating panel of the elevator car 142, such as a destination call for the travel.

With the above described operations the mobile robot 110 is arranged to travel with the package to the destination floor in which an entrance floor to the building 130 resides and it may be detected. For example, the elevator controller 145 may be configured to generate an acknowledgement signal to the control system 170 in response to a detection that the elevator car 110 reaches the destination floor. Alternatively or in addition, it may inform that the elevator doors are opened and/or that the mobile robot 110 exits the elevator car 142. In response to such an acknowledgement the control system 170 may generate a control signal to the robot controller 160 to update the state of the mobile robot 110 to the controlling entity. In some other embodiments, the control system 170 may be configured to generate a control signal to the monitoring system 137 to request a monitoring of the travel of the mobile robot 110 in the entrance floor. Especially, it is in an outmost interest to detect that the mobile robot 110 exists the building 130 and in response to such a detection a control signal may be generated 340 by the control system 170 to the robot controller 160 which control signal comprises data indicative on an assignment of a responsibility of a control of the mobile robot 110 to the robot controller 160. The detection that the mobile robot 110 exits the building 130 may be based on monitoring the doorway of the entrance door 150 and in response to a detection from the sensor data, such as from image data, it may be concluded that the mobile robot 110 carrying the package exits the building 130 and the control signal of assigning the responsibility may be generated 340.

For sake of completeness it is worthwhile to mention that in case the entrance door 150 is not automatic in nature, i.e. that it does not automatically open upon a detection of an object inside the building 130 in a sensor area of the entrance door 150 the exit may require some further operations. For example, the location of the mobile robot 110 may be monitored in the manner as already described and the control system 170 may trigger the access controller 135 to initiate a communication with the mobile robot 110 either directly or indirectly e.g. through the robot controller 160 to determine if the mobile robot 110 in question may exit the building 110. The communication between these entities may comprise sharing of information, such as data identifying the mobile robot 110 in order to determine if the entrance door 150 may be opened or not. Alternatively or in addition, this may only refer to a communication in order to receive an announcement from the mobile robot 110 that it exits the building 110 so as to update records of the control systems 170.

In some example embodiments, the transport of the package in the building 130 by the mobile robot 110 may be monitored in various manners. For example, it may be arranged that the control system 170 is configured to monitor a duration between the generating of the elevator call and the detection of an exit of the mobile robot 110 from the building 130 by comparing if the duration is within a predefined duration limit. Here, the aim is to detect that the mobile robot 110 is not got stuck in the elevator car 142 or lost its way. In response to a detection that the predefined duration limit is exceeded, i.e. the mobile robot 110 has not exited the building within the duration limit from the generation of the elevator call, an alarm signal to the robot controller 160 to indicate a delay in a package transport. The robot controller 160 may be configured to generate further signals, such as informing the recipient of the package on the delay.

Generally speaking, the assignment of the responsibility of the control of the mobile robot 110 to the robot controller 160 from the control system 170 may correspond to that the control system 170 informs the robot controller 160 that the mobile robot 110 has exited the building 130 and is not allowed to utilize any resources available in the building 130. As a result the robot controller 160 may take necessary measures to start managing a travel of the mobile robot 110 outdoors in transporting the package to a destination wherein the destination may refer to a final destination, i.e. the recipient of the package, or a distribution centre into which packages carried by the mobile robots 110 may be collected for further processing.

Moreover, it is clear that the buildings 130 in which the mobile robot 110 provides the transport service of the package may comprise inside doors and gates and any similar. In case the inside doors and similar are so-called automatic doors the mobile robot 110 may pass by the door locations automatically since the door is opened upon a detection of the object, i.e. the mobile robot 110, in a predefined vicinity with respect to the respective door. On the other hand, if the doors are not automatic as such controlling an opening of those may be arranged distantly e.g. by monitoring a location of the mobile robot 110 in the building 130 and comparing it with respect to any inside doors, and similar, and in response to a detection that the mobile robot 110 resides in a location wherein a door blocks forwarding in the route, a control signal to open the door may be generated by the control system 170 e.g. through the access control system 135. In order to generate the control signal further control methods may be associated to it. Namely, in accordance with some example embodiments the mobile robot 110 may be identified at the location of the respective door. For example, a reader device may be positioned at the door area and the mobile robot 110 may be requested to interact with the reader device in a predefined manner in order to access the door. For example, the interaction may be performed in a wireless manner, e.g. utilizing some short-range communication technology, over which the mobile robot 110 may be configured to provide identification data e.g. in a form of the previously mentioned codes, such as QR code or similar, and the control system 170 is configured to analyse if the received identification data qualifies the mobile robot 110 to access the respective door. Alternatively or in addition, the mobile robot 110 may be identified with a camera solution, or any other sensor solution, configured to monitor the door area. In response to the positive result of the evaluation if the mobile robot 110 may access the respective door or similar, a control signal is generated to a door controller from the control system 170 to open the respective door.

Figure 4:
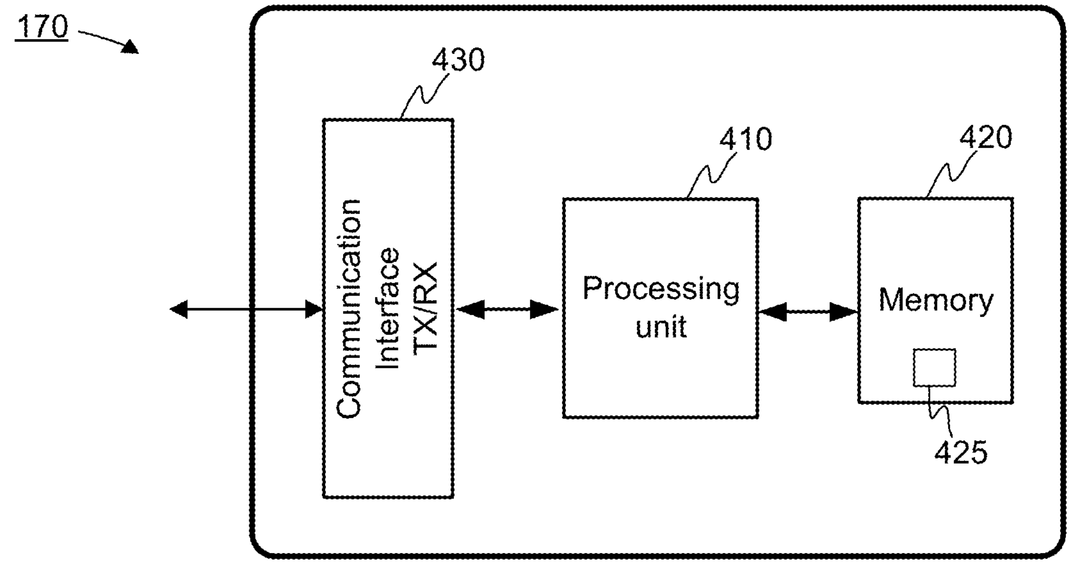
FIG. 4 illustrates schematically a control system according to an example.

As already mentioned, the aspects of the present invention described herein are mainly done by referring to an implementation in which the controlling entity is a dedicated control system 170 as shown in FIG. 1. As already mentioned, the functionality of the control system 170 may also be integrated to another computing device. An example of such an apparatus configurable to implement the operation of the computing device, and, thus, the control system 170, is schematically illustrated in FIG. 4. In other words, the control system 170 may be configured to perform the method according to the invention as described with the examples in the foregoing description. In other words, the apparatus of FIG. 4 may be configured to perform a function to arrange a transport of a package from a sender 120 residing in a building provided with an elevator system 140. For sake of clarity, it is worthwhile to mention that the block diagram of FIG. 4 depicts some components of an entity that may be employed to implement a functionality of the apparatus. The apparatus of FIG. 4 comprises a processor 410 and a memory 420. The memory 420 may store data, such as pieces of data as described, but also computer program code 425 causing the arranging of the transport of the package from the sender 120 in the described manner. The apparatus may further comprise a communication interface 430, such as a wireless communication interface or a communication interface for wired communication, or both to communicate with other entities as described.

The communication interface 430 may thus comprise one or more modems, antennas, and any other hardware and software for enabling an execution of the communication e.g. under control of the processor 410. Furthermore, I/O (input/output) components may be arranged, together with the processor 410 and a portion of the computer program code 425, to provide a user interface for receiving input from a user, such as from a technician, and/or providing output to the user of the apparatus when necessary. In particular, the user 1/O components may include user input means, such as one or more keys or buttons, a keyboard, a touchscreen, or a touchpad, etc. The user 1/O components may include output means, such as a loudspeaker, a display, or a touch-screen. The components of the apparatus may be communicatively connected to each other via data bus that enables transfer of data and control information between the components.

The memory 420 and at least a portion of the computer program code 425 stored therein may further be arranged, with the processor 410, to cause the apparatus to perform at least a portion of a method as is described herein. The processor 410 may be configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some, or all of which may be integrated/removable and/or may provide permanent/semi-permanent/dynamic/cached storage.

The computer program code 425 may comprise computer-executable instructions that implement functions that correspond to steps implemented in the method when loaded into the processor 410 of the respective control system 170. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the apparatus to perform a method as described. Hence, the apparatus may comprise at least one processor 410 and at least one memory 420 including the computer program code 425 for one or more programs, the at least one memory 420 and the computer program code 425 configured to, with the at least one processor 410, cause the apparatus implementing the control system 170 to perform the method.

The computer program code 425 may be provided e.g. a computer program product comprising at least one computer-readable non-transitory medium having the computer program code 425 stored thereon, which computer program code 425, when executed by the processor 410 causes the apparatus to perform the method. The computer-readable non-transitory medium may comprise a memory device or a record medium, such as a CD-ROM, a DVD, a Blu-ray disc, or another article of manufacture that tangibly embodies the computer program. As another example, the computer program may be provided as a signal configured to reliably transfer the computer program.

Still further, the computer program code 425 may comprise a proprietary application, such as computer program code for causing an execution of the method in the manner as described in the description herein.

Any of the programmed functions mentioned may also be performed in firmware or hardware adapted to or programmed to perform the necessary tasks.

For sake of completeness it is worthwhile to mention that the entity performing the method in the role of the control system 170 may also be implemented with a plurality of apparatuses, such as the one schematically illustrated in FIG. 4, as a distributed computing environment corresponding to a control system. For example, one of the apparatuses may be communicatively connected with the other apparatuses, and e.g. share the data of the method, to cause another apparatus to perform at least one other portion of the method. As a result, the method performed in the distributed computing environment generates the control signal indicative of the assignment of the responsibility as described. For example, some steps of the method may be shared between the control system 170, the elevator controller 145, the access controller 135, and the robot controller 160 at least in part.

Some aspects of the invention may relate to a system comprising the entities as described and configured to implement the method as described in the foregoing description.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A control system for arranging a transport of a package from a building provided with an elevator system, the control system is configured to:

receive an indication descriptive on that the mobile robot has received the package from a sender to transport the package from the building, generate an acknowledgement to the mobile robot, the acknowledgement comprising data causing the mobile robot to initiate the transport of the package, arrange an elevator service to the mobile robot by generating an elevator call to the elevator system to request an arrival of an elevator car to a floor the mobile robot resides and a travel of the elevator car to a destination floor comprising an entrance door of the building, and generate, in response to a detection that the mobile robot exits the building, a control signal to a robot controller, the control signal comprising data indicative on an assignment of a responsibility of a control of the mobile robot to the robot controller.

2. The control system according to claim 1, wherein the control system is arranged to receive the indication descriptive on that the mobile robot has received the package from a sender to transport the package from the building from at least one of the following: the mobile robot; the sender of the package.

3. The control system according to claim 1, wherein the control system is configured to monitor a waiting time of the mobile robot to receive the package in response to an arrival of the mobile robot at a collection point of the package.

4. The control system according to claim 3, wherein the control system is configured to release the mobile robot from a task of transporting the package in response to a detection that the mobile robot does not receive the package within a predefined time window set as an acceptable waiting time.

5. The control system according to claim 1, wherein the control system is configured to generate the acknowledgement comprising route data for the mobile robot to exit the building.

6. The control system according to claim 1, wherein the control system is configured to trigger a generation of the elevator call based on at least one of the following: a generation of the acknowledgement; a detection that the mobile robot resides in a predefined location in the building.

7. The control system according to claim 1, the control system further configured to:

generate a control signal to a monitoring system to initiate a monitoring of the mobile robot in a floor comprising an entrance door to exit the building.

8. The control system according to claim 7, wherein the control system is configured to generate the control signal to initiate the monitoring of the mobile robot in response to a detection that the elevator car arrives at the floor comprising the entrance door.

9. The control system according to claim 7, wherein the control system is configured to perform the detection that the mobile robot exits the building based on the data received from the monitoring system.

10. The control system according to claim 1, the control system is further configured to:

monitor a duration between the generation of the elevator call and the exit of the mobile robot from the building by comparing if the duration is within a predefined duration limit, and generate, in response to a detection that the predefined duration limit is exceeded, an alarm to the robot controller to indicate a delay in a package transport.

11. A method, performed by a control system, for arranging a transport of a package from a building provided with an elevator system, the method comprises:

receiving an indication descriptive on that the mobile robot has received the package from a sender to transport the package from the building, generating an acknowledgement to the mobile robot, the acknowledgement comprising data causing the mobile robot to initiate the transport of the package, arranging an elevator service to the mobile robot by generating an elevator call to the elevator system to request an arrival of an elevator car to a floor the mobile robot resides and a travel of the elevator car to a destination floor comprising an entrance door of the building, and generating, in response to a detection that the mobile robot exits the building, a control signal to a robot controller, the control signal comprising data indicative on an assignment of a responsibility of a control of the mobile robot to the robot controller.

12. The method according to claim 11, wherein the indication descriptive on that the mobile robot has received the package from a sender to transport the package from the building is received from at least one of the following: the mobile robot; the sender of the package.

13. The method according to claim 11, wherein a waiting time of the mobile robot to receive the package is monitored in response to an arrival of the mobile robot at a collection point of the package.

14. The method according to claim 13, wherein the mobile robot is released from a task of transporting the package in response to a detection that the mobile robot does not receive the package within a predefined time window set as an acceptable waiting time.

15. The method according to claim 11, wherein the acknowledgement comprising route data for the mobile robot to exit the building is generated.

16. The method according to claim 11, wherein a generation of the elevator call is triggered based on at least one of the following: a generation of the acknowledgement; a detection that the mobile robot resides in a predefined location in the building.

17. The method according to claim 11, the method further comprises:

generating a control signal to a monitoring system to initiate a monitoring of the mobile robot in a floor comprising an entrance door to exit the building.

18. The method according to claim 17, wherein the control signal to initiate the monitoring of the mobile robot is generated in response to a detection that the elevator car arrives at the floor comprising the entrance door.

19. The method according to claim 17, wherein the detection that the mobile robot exits the building is performed based on the data received from the monitoring system.

20. The method according to claim 11, the method further comprises:

monitoring a duration between the generation of the elevator call and the exit of the mobile robot from the building by comparing if the duration is within a predefined duration limit, and generating, in response to a detection that the predefined duration limit is exceeded, an alarm to the robot controller to indicate a delay in a package transport.

21. A non-transitory computer readable medium comprising a computer program comprising computer readable program code configured to cause performing of the method according to claim 11 when the computer readable program code is run on one or more computing apparatuses.

* * * * *